United States Patent
Judd et al.

(10) Patent No.: US 12,051,450 B1
(45) Date of Patent: Jul. 30, 2024

(54) DETERMINING LATERAL ERROR OFFSETS TO ADJUST A LATERAL POSITION AT WHICH TO MOVE A TAPE HEAD WITH RESPECT TO A TAPE MEDIUM

(71) Applicant: INTERNATIONAL BUSINESS MACHINES CORPORATION, Armonk, NY (US)

(72) Inventors: Kevin Bruce Judd, Tucson, AZ (US); Randy Clark Inch, Tucson, AZ (US); David Lee Swanson, Tucson, AZ (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 0 days.

(21) Appl. No.: 18/359,663

(22) Filed: Jul. 26, 2023

(51) Int. Cl.
G11B 5/588 (2006.01)
G11B 5/596 (2006.01)

(52) U.S. Cl.
CPC .......... *G11B 5/588* (2013.01); *G11B 5/59672* (2013.01)

(58) Field of Classification Search
None
See application file for complete search history.

(56) References Cited

U.S. PATENT DOCUMENTS

| | | |
|---|---|---|
| 5,055,951 A | 10/1991 | Behr |
| 5,982,711 A | 11/1999 | Knowles et al. |
| 7,411,759 B2 | 8/2008 | Trabert et al. |
| 7,436,621 B2 | 10/2008 | Goker et al. |
| 7,764,460 B2 * | 7/2010 | Bates ............ G11B 5/584 360/77.12 |
| 7,876,521 B2 | 1/2011 | Cherubini et al. |
| 7,961,421 B1 * | 6/2011 | Bui ............ G11B 5/584 360/76 |
| 8,780,486 B2 * | 7/2014 | Bui ............ G11B 20/10398 360/76 |

(Continued)

FOREIGN PATENT DOCUMENTS

EP 1204096 B1 6/2008

OTHER PUBLICATIONS

Jose, et al., "Characterization of lateral tape motion and disturbances in the servo position error signal of a linear tape drive," Tribology International 38, 2005, 8 pp.

(Continued)

*Primary Examiner* — Fred Tzeng
(74) *Attorney, Agent, or Firm* — KONRAD, RAYNES, DAVDA & VICTOR LLP; David W. Victor (57) ABSTRACT

Provided are a controller, tape drive, and method for determining a lateral position at which to move a tape head. The tape head, comprising a first module having a first servo reader and a second module having a second servo reader, is rotated to rotate the second servo reader at skew angles with respect to the first servo reader. A determination is made of estimated lateral positions of the second reader at the skew angles. Expected lateral positions of the second servo reader at the skew angles are calculated from a calculated distance between the first and the second servo readers and the skew angles. Lateral error offsets, comprising differences of estimated lateral positions and expected lateral positions at the skew angles, are added to an error offset data structure used to adjust a target lateral position at which to position the tape head.

20 Claims, 7 Drawing Sheets

(56) References Cited

U.S. PATENT DOCUMENTS

| | | | |
|---|---|---|---|
| 9,019,651 B2* | 4/2015 | Bui | G11B 5/588 360/77.01 |
| 9,997,184 B1* | 6/2018 | Bui | G11B 5/5926 |
| 10,366,716 B1 | 7/2019 | Judd et al. | |
| 10,388,312 B2* | 8/2019 | Bui | G11B 5/0086 |
| 10,650,852 B2 | 5/2020 | Judd et al. | |
| 10,657,997 B2* | 5/2020 | Judd | G11B 5/00817 |
| 10,770,102 B2* | 9/2020 | Bui | G11B 5/584 |
| 11,183,209 B2 | 11/2021 | Yamaga et al. | |
| 11,404,078 B1 | 8/2022 | Swanson et al. | |
| 11,776,569 B1* | 10/2023 | Biskeborn | G11B 5/59688 360/77.12 |
| 2014/0029130 A1* | 1/2014 | Bui | G11B 20/10305 360/70 |
| 2015/0302875 A1* | 10/2015 | Cherubini | G11B 27/19 360/77.12 |
| 2020/0035264 A1 | 1/2020 | Judd et al. | |
| 2022/0284923 A1 | 9/2022 | Yamaga et al. | |
| 2023/0317108 A1* | 10/2023 | Nakao | G11B 5/584 360/76 |

OTHER PUBLICATIONS

Cherbuini, et al., "High Performance Servo Channel for Nanometer Head Positioning in Tape Systems," 2012 IEEE/ASME International Conference on Advanced Intelligent Mechatronics, Jul. 2012, 8 pp.

Lantz, et al., "Servo-Pattern Design and Track-Following Control for Nanometer Head Positioning on Flexible Tape Media," IEEE Transactions on Control Systems Technology, vol. 2, Mar. 2012, 13 pp.

"Data Interchange on 12,7 mm 384-Track Magnetic Tape Cartridges—Ultrium-1 Format", ECMA Standardizing Information and Communication Systems, Standard ECMA-319, Jun. 2001, 160 pp.

* cited by examiner

DETERMINING LATERAL ERROR OFFSETS TO ADJUST A LATERAL POSITION AT WHICH TO MOVE A TAPE HEAD WITH RESPECT TO A TAPE MEDIUM

BACKGROUND OF THE INVENTION

1. Field of the Invention

Provided are a tape head controller, tape drive, and method for determining lateral error offsets to adjust a lateral position at which to move a tape head with respect to a tape medium.

2. Description of the Related Art

In magnetic storage systems, data is read from and written onto magnetic recording media utilizing magnetic read and write elements formed on a tape head. Data is written on the magnetic recording media by moving a magnetic recording transducer to a position over the media where the data is to be stored. The magnetic recording transducer generates a magnetic field, which encodes the data into the magnetic media. Data is read from the media by similarly positioning the magnetic read element and then sensing the magnetic field of the magnetic media. Read and write operations may be independently synchronized with the movement of the media to ensure that the data can be read from and written to the desired location on the media.

State-of-the-art linear magnetic tape recording systems use timing-based servo (TBS) patterns to estimate the head position. Recorded servo patterns consist of transitions with two different azimuthal slopes. Head (y) position and velocity information are derived from the relative timing of pulses generated by a servo reader reading the pattern. During tape drive operation, a magneto-resistive servo read transducer in the head scans over the servo pattern and produces a readback signal. A servo channel processes the servo readback signal and measures the time intervals between bursts of stripes/dibits to estimate the tape head lateral position (a.k.a. y-position) relative to the servo pattern. A position-error signal (PES) is generated by subtracting the estimated head position from the desired lateral position/trajectory and fed to a servo controller. The servo controller, in combination with a current driver and a head actuator, adjusts the position of the head and thereby closes the track-following servo control loop.

SUMMARY

Provided are a tape head controller, tape drive, and method for determining lateral error offsets to adjust a lateral position at which to move a tape head with respect to a tape medium. The tape head, comprising a first module having a first servo reader and a second module having a second servo reader, is rotated to rotate the second servo reader at skew angles with respect to the first servo reader. A determination is made of estimated lateral positions from servo readback signals read by the second servo reader at the skew angles. Expected lateral positions of the second servo reader at the skew angles are calculated from a calculated distance between the first and the second servo readers and the skew angles. A determination is made of lateral error offsets comprising differences of estimated lateral positions and expected lateral positions at the skew angles. The lateral error offsets for the expected lateral positions are added to an error offset data structure. The error offset data structure is used to adjust a target lateral position at which to position the tape head.

DETAILED DESCRIPTION

The lateral position of the tape head, also known as the y-position, is estimated from the TBS servo patterns by measuring the time between the A-burst and B-burst stripes (and between C-burst and D-burst stripes), also termed as A-Counts (Ai). Specifically, the y-position is linearly dependent on the A-Count values (Ai), provided that the servo stripes are perfectly "straight".

However, servo patterns that are factory pre-formatted on tape cartridges are often not perfectly "straight" due to manufacturing imperfections or defects in the servo writer. This leads to a non-linear relationship between the estimated y-position (based on Ai measurements) and the actual y-position of the head. Because the reliability of the y-position estimate is dependent on the servo pattern stripes being perfectly straight or linearity, non-linear servo stripes results in errors in estimates of the y-position.

Further, there may be imperfections in the assembly of the tape head, which consists of two modules attached together with an adhesive. Different tape heads may have different distances between the modules due to variations in the application and drying of the adhesive between the tape head modules. Further, the assembly to attach the modules with the adhesive may result in a misalignment of the modules, i.e., skews between servo readers at the top and bottom of the modules, i.e., top-bottom skew, and skews between the left and right servo readers on the different modules not fully aligned, resulting in the servo readers at the same positions on the different modules not perfectly aligned. These misalignments in the assembly of the tape head may introduce further errors in reading the readback signal from the servo patterns.

Described embodiments provide improvements to tape technology and reading tape servo patterns by calculating the module-to-module distance for a tape head to determine an actual measurement of the distance of the tape head modules. The actual measurement will be more accurate than the specification distance due to discrepancies in assembly of the tape head. Further, described embodiments provide improvements to determining a lateral position at which to move the tape head by determining an error offset between an expected lateral ($y_{exp}$) position and the position on the non-linear servo pattern, estimated lateral position ($y_{est}$) corresponding. This error offset may be used to adjust target lateral positions at which to move the tape head during operations, to provide accurate lateral movements that take into account the non-linearity of the servo pattern used to track the lateral movement of the tape head.

Figure 1:
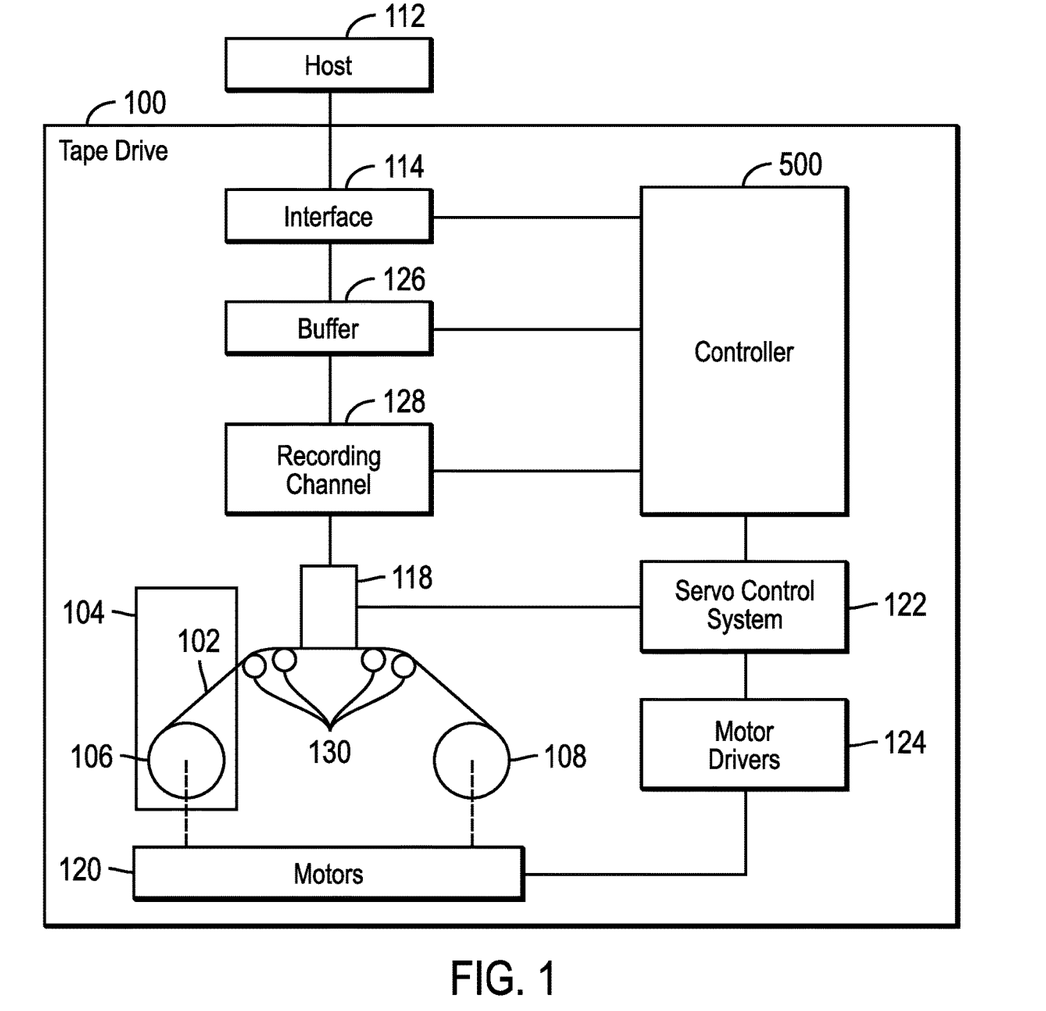
FIG. 1 illustrates an embodiment of a tape drive system in which embodiments are implemented.

FIG. 1 illustrates an embodiment of a tape drive 100 to read and write with respect to a magnetic tape 102 of a magnetic tape cartridge 104. The magnetic tape cartridge 104 comprises a length of magnetic tape 102 wound on one or two reels 106, 108. By way of example, the magnetic tape cartridge 104 may comprise a single reel tape, such as adhering to the Linear Tape Open (LTO) format. An example of a tape drive 100 is the International Business Machines Corporation TS1160 Tape Drive. Other implementations of the tape cartridge 104 and tape drive may also be used, such as LTO type tape drives.

The tape drive 100 may further include one or more controllers 500 to operate the tape drive 100 in accordance with commands received from a host system 112 received at an interface 114. The controller 500 includes logic and/or one or more microprocessors with a memory for storing information and program information for operating the microprocessor(s). The tape drive 100 may comprise a standalone unit or comprise a part of a tape library or other subsystem. The tape drive 100 may be coupled to the host system 112 directly, through a library, or over a network, and employ at interface 14 a Small Computer Systems Interface (SCSI), an optical fiber channel interface, etc.

The tape cartridge 104 may be inserted in the tape drive 100 and loaded by the tape drive 100 mechanisms so that one or more read and/or write elements on a tape head 118 reads and/or writes information in the form of signals with respect to the magnetic tape 102 as the tape is moved longitudinally by one or more motors 120 which rotate the reels 106, 108. Tape guide rollers 130 guide the tape 102 across the tape head 118 to stabilize the positioning of the tape 102 with respect to the head 118 to reduce position error signals (PES). The magnetic tape typically comprises a plurality of parallel tracks, or groups of tracks. In some formats, such as the LTO format, above, the tracks are arranged in a serpentine back and forth pattern of separate wraps.

The recording system may comprise a servo control system 122 to electronically switch to another set of read and/or write elements on the tape head 118, and/or to seek and move the tape head 118 laterally on the tape medium 102, to position the read and write elements at a desired wrap or wraps, and to track follow the desired wrap or wraps. The servo control system 122 may also control the operation of the motors 120 through motor drivers 124 and in response to instructions from the controller 500.

The controller 500 also provides the data flow and formatter for data to be read from and written to the tape, employing a buffer 126 and a recording channel 128. The controller 500 may comprise program code in a memory device that is loaded into a processor and executed to perform the tape drive operations. Alternatively, some or all of the functions of the controller 500 may be implemented as microcode or firmware in hardware devices in the tape drive 100, such as in Application Specific Integrated Circuits (ASICs). The buffer 126 may comprise a suitable volatile or non-volatile memory device known in the art.

Figure 2:
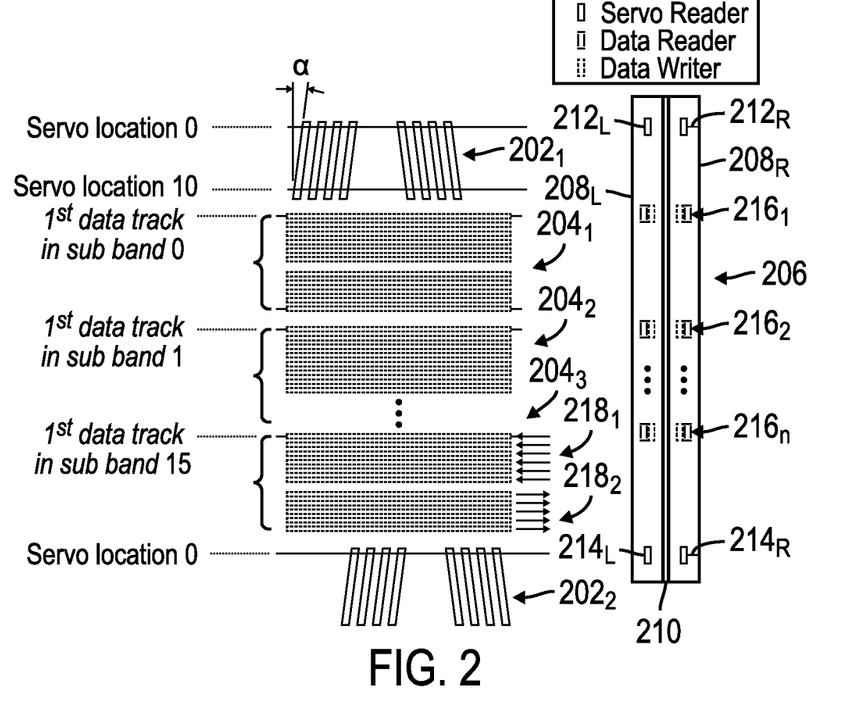
FIG. 2 illustrates an embodiment of a tape head having modules and servo bands and data bands for the tape head to read and write.

FIG. 2 illustrates an example of two bands of a servo patterns $202_1$, $202_2$ with multiple bands of data tracks $204_1$, $204_2$, $204_3$ between the servo patterns $202_1$, $202_2$. The servo patterns $202_1$, $202_2$ are utilized to derive information about the tape velocity, head position, and longitudinal tape position from the relative placement of the servo stripes within a servo frame. A tape head 206, such as tape head 118, is comprised of a left $208_L$ and right $208_R$ modules bound together by an adhesive layer 210 between the modules. FIG. 2 shows the modules $208_L$, $208_R$ having two sets of servo readers each having a top left $212_L$ and right $212_R$ servo readers, a bottom left $214_L$ and right $214_R$ servo readers and readers/writers $216_1$, $216_2$ . . . $216_n$ therebetween. In further embodiments, there may be additional rows of servo readers at the top and bottom of the modules $208_1$, $208_2$, and additional read/write elements.

The data band areas $204_1$, $204_2$, $204_3$ are filled by writing tracks in a serpentine fashion as illustrated with arrows $218_1$, $218_2$. The data band is filled by running the head 206 back and forth over the tape, incrementing the position with each pass, until the entire data band is filled. The position in the servo bands $202_1$, $202_2$ that correspond to a given data track is referred to as the servo location. The servo patterns $202_1$, $202_2$ provide position information to allow positioning of the head at each of the data track locations.

Figure 3:
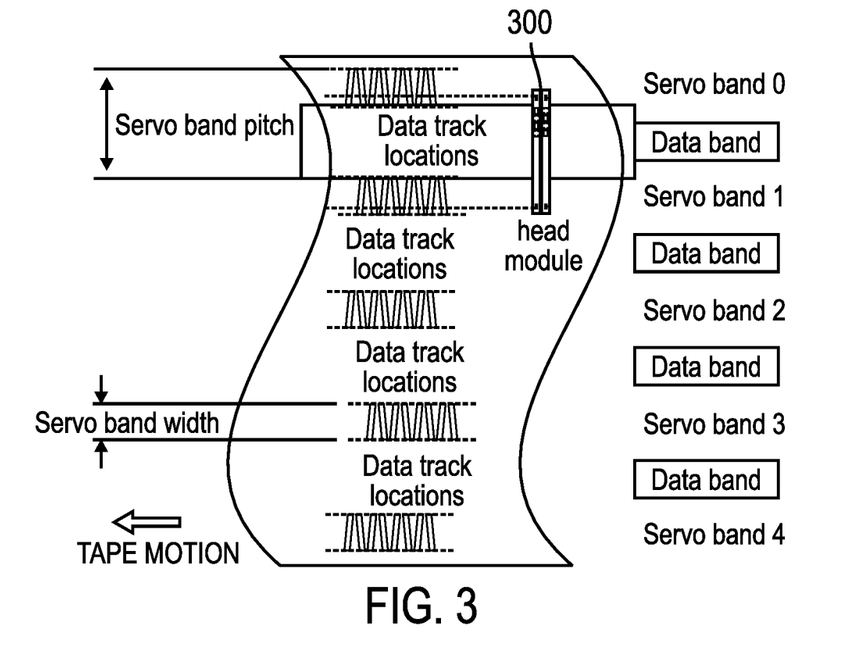
FIG. 3 illustrates an example of how data track locations are interspersed between servo bands on a tape medium.

FIG. 3 provides an illustration showing how multiple layers of four data bands positioned between five servo bands are positioned between servo bands, and how the tape head 300 may move laterally to the different data track locations.

Figure 4:
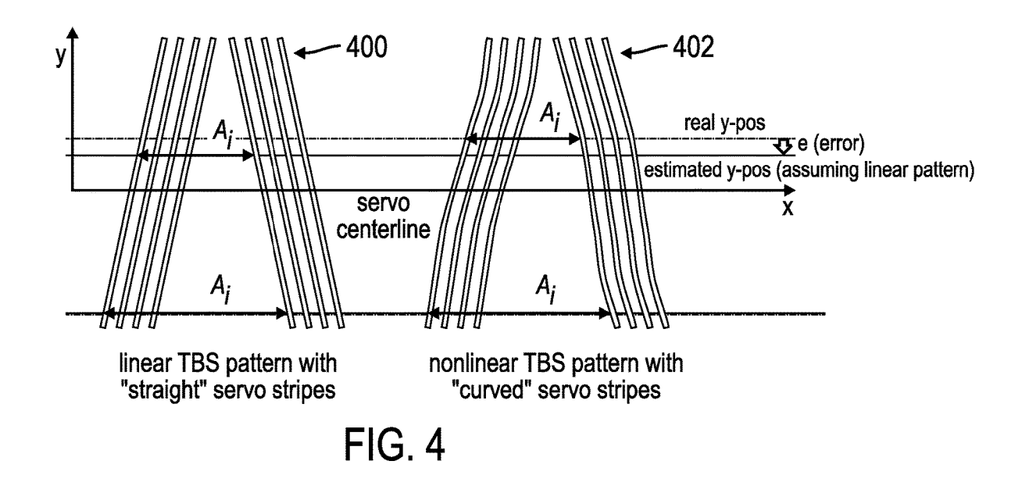
FIG. 4 illustrates an example of a comparison of a linear servo pattern and a non-linear servo pattern.

FIG. 4 illustrates a servo pattern 400 having linear lines, where the y-position estimates of the lateral position of the tape head may be determined directly from the linear servo pattern. However, in actual implementations, the servo pattern 402 may have a curved or non-linear servo pattern, e.g., chevrons, which makes the determination of the y-position estimate assuming linearity for different servo readback signals inaccurate. A TBS pattern 400 is linear if the A-count distance (Ai) linearly increases as a function of the (y)-position of the servo reader trajectory. For non-linear servo patterns 402, there is a y-position dependent error 'e' of the estimated y-position versus the true y-position.

Figure 5:
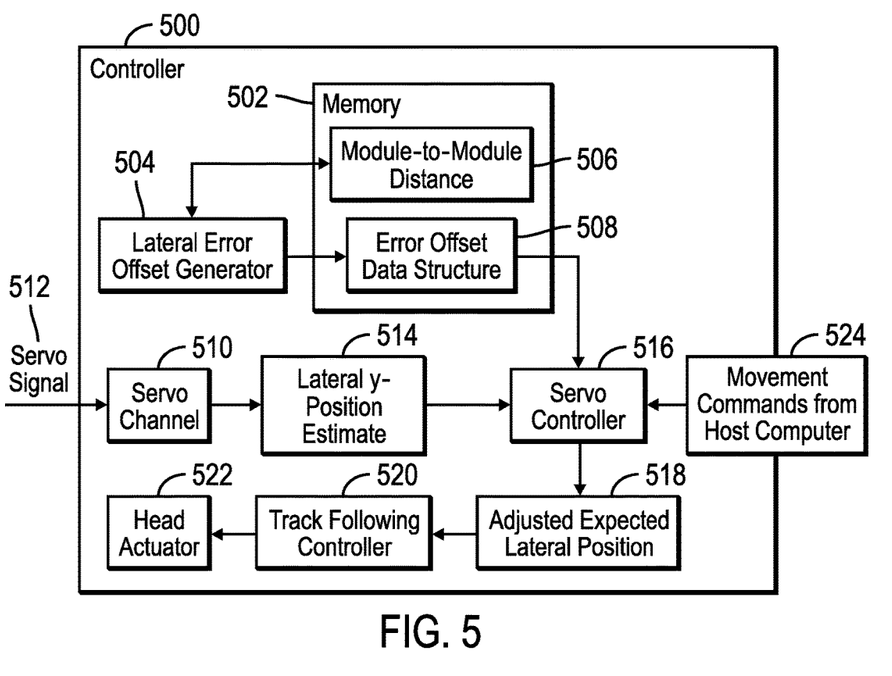
FIG. 5 illustrates an embodiment of a controller in a tape drive.

FIG. 5 illustrates an embodiment of the controller 500 including a memory 502; a lateral offset generator 504 to calculate a module-to-module distance 506, stored in the memory 502, between tape modules $208_L$, $208_R$, or the distance between the left $212_L$, $214_L$ and right $212_R$. $214_R$ servo readers; an error offset data structure 508, generated by the lateral error offset generator 504, that includes lateral error offsets between estimated lateral positions, from readback signal on non-linear servo pattern, and expected lateral positions calculated from the geometry of the tape head 118; a servo channel 510 to process a servo signal 512 resulting from reading servo patterns with the servo readers $212_L$, $212_R$, $214_L$, $214_R$ and to generate y-position (lateral position) estimates 514 and velocity estimates; a servo controller 516 that receives the lateral position 514 estimates and adjusts them with the error offsets in the error offset data structure 508 to produce an adjusted expected lateral ($y_{exp}$) position 518 that is used to control the track following controller 520 to follow the lateral tape motion and control an actuator 522 to position the tape head 118 read/write elements at the centerline of the data tracks.

The servo controller 516 may further receive tape movement commands 524 from a host computer 112 and adjust the requested position 520 to produce adjusted expected lateral position 518 to use to control the track following controller 520 to move the tape head 118 to read or write at a different lateral position in the data areas.

The arrows shown in FIG. 5 between the components and objects represent a data flow between the components.

The program components 504, 510, 516, 520, among others, may be accessed by a processor from memory to execute or implemented in hardware logic and components, such as on a Digital Signal Processing (DSP)/Field Programmable Gate Array (FPGA) board.

Figure 6:
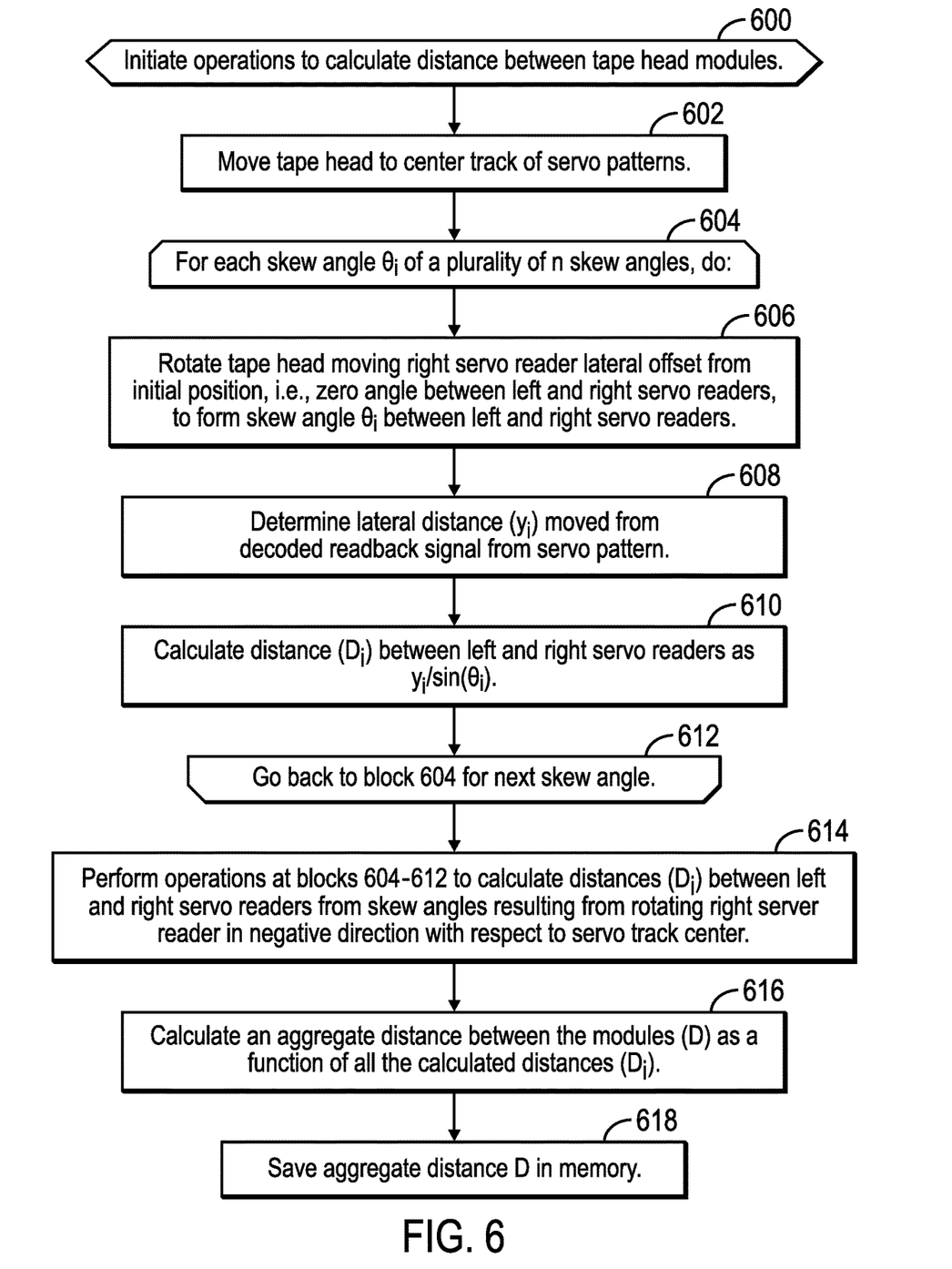
FIG. 6 illustrates an embodiment of operations to calculate a distance between tape head modules.
Figure 7:
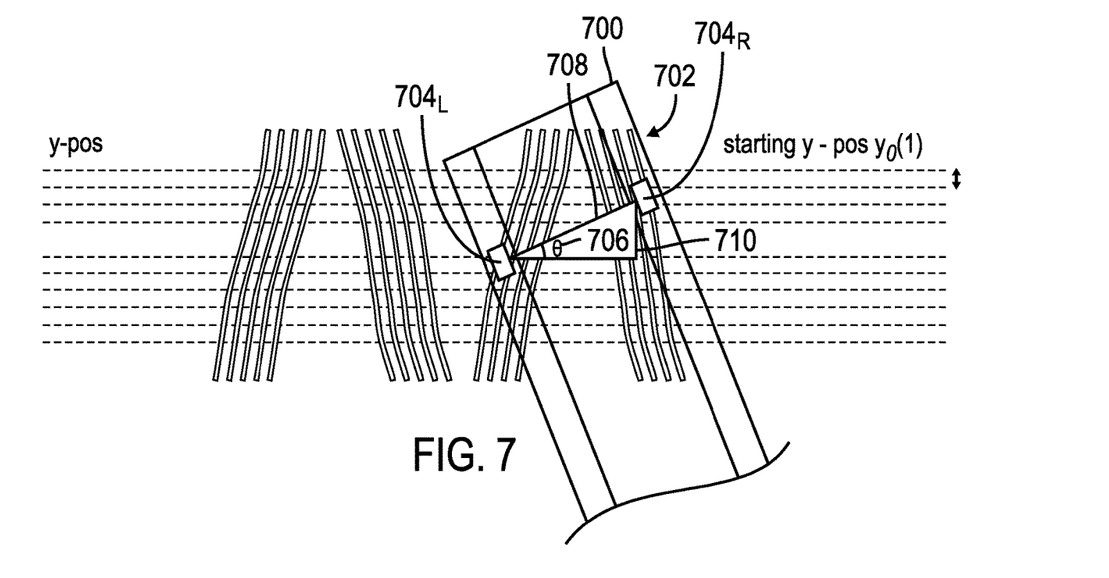
FIG. 7 illustrates an example of how a tape head is rotated to read from a non-linear servo pattern.

FIG. 6 illustrates an embodiment of operations performed by the lateral error offset generator 504, servo channel 510, and servo controller 516 to generate the module-to-module distance 506 between the servo readers $212_L$ and $212_R$ on the tape head modules $208_L$, $208_R$. The operations of FIG. 6 may be performed to generate the distance 506 when a tape cartridge 104 is inserted in the tape drive 100 or performed once and used for different tape cartridges 104 inserted. Upon initiating (at block 600) operations to calculate the distances between modules of the tape head 206, the servo controller 516 controls (at block 602) the track following controller 520 to control the head actuator 522 to move the tape head 118 to a center track of the servo patterns. For each skew angle $\theta_i$ of a plurality of skew angles between the right servo reader $212_R$ and left servo reader $212_L$ formed when the tape head 206 is rotated, a loop of operations is performed at blocks 604 through 612. At block 606, the servo controller 516 controls the track following controller 520 to rotate the tape head 700 by moving the right servo reader $212_R$ a lateral offset, shown as lateral distance 710 in FIG. 7, from initial position, i.e., zero angle between left and right servo readers, to form skew angle $\theta i$ 706 between the left $212_L$ and right $212_R$ servo readers. FIG. 7 shows a tape head 700 on a non-linear servo pattern 702 rotated to rotate the right servo reader $704_R$ with respect to the left servo reader $704_L$ to form skew angle $\theta$ 706.

The servo controller 516 determines (at block 608) a lateral distance ($y_i$) moved from the decoded readback signal the servo channel 510 reads from the servo pattern 702. The lateral error offset generator 504 calculates (at block 610) a distance $D_i$ 708 between the left $704_L$ and right $704_R$ servo readers as yi divided by $\sin(\theta_i)$. Control proceeds (at block 612) back to block 604 until distances are calculated at different skew angles. The lateral error offset generator 504, and other components may then perform (at block 614) the operations at blocks 604-612 to calculate distances (Di) between left $704_L$ and right $704_R$ servo readers from skew angles resulting from rotating right servo reader $704_R$ in negative direction with respect to servo track center.

The lateral error offset generator 504 may calculate (at block 616) an aggregate distance (D) between the modules, e.g., left and right servo readers, as a function of all the calculated distances ($D_i$) at blocks 604 through 614. The aggregate distance (D) may comprise an average of the calculated distances (Di) or some other statistical value representative of the distance 708. The aggregate distance D 708 is stored (at block 618) in the memory 502.

With the embodiment of FIG. 6, the actual module-to-module distance 708 is calculated from read servo patterns. This allows for later accurate estimates of lateral movements for non-linear servo patterns because different tape heads 206, 700 may have different distances between the modules resulting from variations in the application or drying of the adhesive used to couple the modules $208_L$. $208_R$. In this way, the distance D 708 is measured for the specific tape head.

Figure 8:
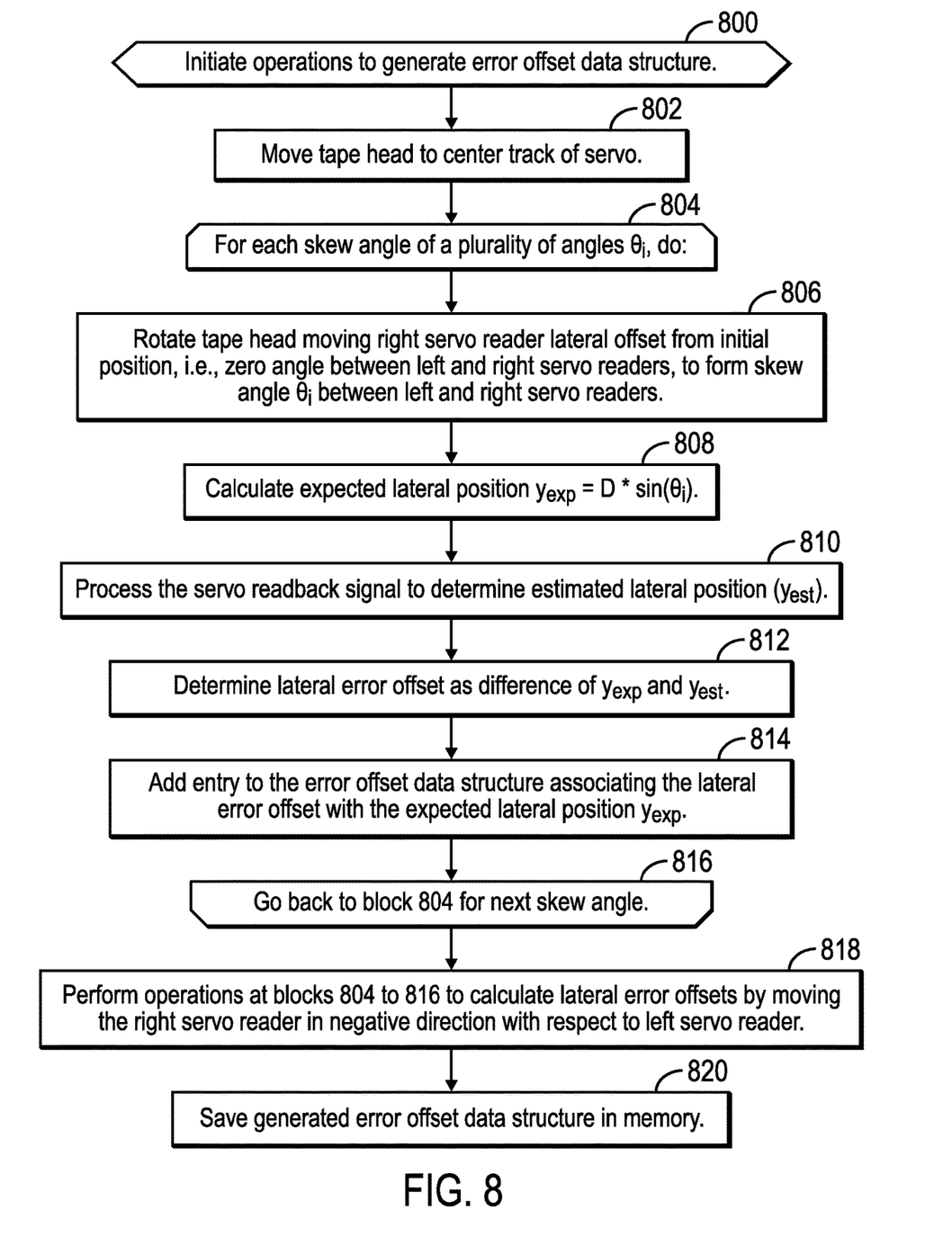
FIG. 8 illustrates an embodiment of operations to generate an error offset data structure of lateral position errors to use to adjust a lateral position to account for non-linearity of the servo pattern.

FIG. 8 illustrates an embodiment of operations performed by the lateral error offset generator 504, servo channel 510, and servo controller 516 to generate the error offset data structure 508 to provide error offsets for non-linear servo patterns. The operations of FIG. 8 may be performed when a tape cartridge 104 is inserted in the tape drive 100 to generate the offsets specific to the non-linear servo patterns on the tape medium in the inserted cartridge 104. Upon initiating (at block 800) operations to generate the lateral error offset data structure 508, the servo controller 516 controls (at block 802) the track following controller 520 to control the head actuator 522 to move the tape head 118 to a center track of the servo patterns. For each skew angle $\theta_i$ of a plurality of skew angles between the right servo reader $212_R$ and left servo reader $212_L$ formed when the tape head 206 is rotated, a loop of operations is performed at blocks 804 through 816. At block 806, the servo controller 516 controls the track following controller 520 to rotate the tape head 206 by moving the right servo reader $704_R$ a lateral offset ($y_i$), shown as lateral distance 710 in FIG. 7, from initial position, e.g., zero angle, between left $704_L$ and right $704_R$ servo readers, to form skew angle $\theta_i$ 706 between the left $704_L$ and right $704_R$ servo readers.

The servo controller 516 calculates (at block 808) an expected lateral position $y_{exp}$ 710, i.e., the lateral ($y_{exp}$) distance the right servo reader $704_R$ rotated relative to the left servo reader $704_L$, as D 708 multiplied by the $\sin(\theta_i)$. The servo channel 510 processes (at block 810) the servo readback signal, read by the right servo reader $704_R$ when rotated to determine an estimated lateral position ($y_{est}$). In this way, the expected lateral position $y_{exp}$ is the lateral position corresponding to a true linear servo pattern, whereas the estimated lateral position ($y_{est}$) is based on the real-world observed servo pattern, which may be non-linear. The lateral error offset generator 504 determines (at block 812) a lateral error offset as a difference of the expected lateral position ($y_{exp}$) 710 and the estimated lateral position $y_{exp}$ produced by the servo channel 510 from the servo readback signal 512. An entry is added (at block 814) to the error offset data structure 508 associating the lateral error offset, $y_{exp}$-$y_{est}$, with the expected lateral position $y_{exp}$ 710.

Control proceeds (at block 814) back to block 804 until the lateral error offsets are calculated for all the different skew angles. The lateral error offset generator 504, and other components may then perform (at block 818) the operations at blocks 804-816 to calculate lateral error offsets to include in the error offset data structure 508 from skew angles resulting from rotating right servo reader $704_R$ in negative direction with respect to the servo track center. The generated error offset data structure 508 is saved (at block 820) in the memory 502 for use during servo controller operations to adjust a target lateral position to which to move by the lateral error offset for that position.

The embodiment of FIG. 8 generates lateral error offsets that may be used to adjust a target lateral position movement to produce the lateral position that is on the non-linear servo pattern line to direct the tape head to move to the adjusted lateral position on the non-linear servo pattern. In this way, the error offset data structure 508 is used to map a lateral position to which to move a tape head calculated for a linear servo pattern space to a non-linear servo pattern space in the real-world tape medium. In this way, the servo controller maintains lateral error offsets due to the non-linearity of the servo pattern to more accurately control the movement of the tape head.

Figure 9:
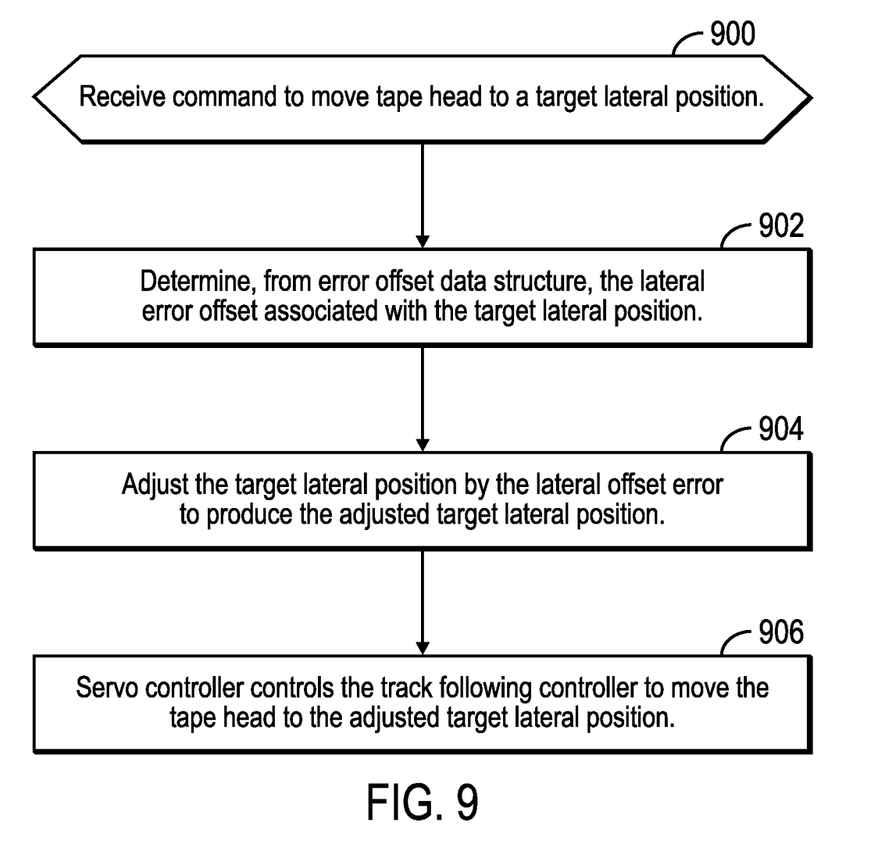
FIG. 9 illustrates an embodiment of operations to adjust lateral positions at which to move the tape head by lateral offset errors.

FIG. 9 illustrates an embodiment of operations performed by the servo controller 516 to utilize the error offset data structure 508 to generate lateral positions at which to move the tape head 206 along the non-linear servo pattern. Upon the servo controller 516 receiving (at block 900) a command to move the tape head 206 to a target lateral position, which may comprise movement commands 524 from the host computer 112, the servo controller 516 determines (at block 902), from the error offset data structure 508, the lateral error offset associated with the received target lateral position. If the error offset data structure 508 does not include an entry providing a lateral offset error for a lateral position equal to the target lateral position, then the determined lateral offset error may comprise the lateral offset error associated with the lateral position in the error offset data structure 508 closest to the target lateral position. Alternatively, the determined lateral offset error may be an average of the lateral offset errors in the error offset data structure 508 associated with the two lateral positions closest to the target lateral position. Other techniques may also be used to estimate or interpolate the lateral offset error from the information in the error offset data structure 508.

The target lateral position is then adjusted (at block 904) by the lateral offset error, such as by subtracting the lateral offset error, to produce an adjusted target lateral position, which corresponds to the target lateral position on the non-linear skew pattern. The servo controller 516 controls the track following controller 520 to move the tape head 206 to the adjusted target lateral position that is reached when the servo channel 510 processes readback servo signals 510 from the servo pattern at an estimated lateral y-position comprising the adjusted target lateral position.

With the embodiment of FIG. 9, the servo controller 516 adjusts target lateral positions to account for the non-linearity of the skew pattern to allow the servo controller 516 to accurately move to the lateral position that is detected at the adjusted target lateral position in the non-linear servo pattern. This provides for more accurate positioning of the tape head to account for the fact that the servo pattern is non-linear. Estimates of lateral position that assume linearity may not move the tape head to the correct position. In the described embodiment, variables i, n, etc., when used with different elements may denote a same or different instance of that element or different number of elements.

Terms such as "top", bottom", "left", "right" and the like may be used for descriptive purposes only and are not to be construed as limiting. Embodiments may be manufactured, used, and contained in a variety of positions and orientations.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A tape head controller for controlling a tape head, comprising a first module having a first servo reader and a second module having a second servo reader, with respect to a servo pattern written to a tape medium, wherein the tape head controller performs operations, the operations comprising:
   rotating the tape head to rotate the second servo reader at skew angles with respect to the first servo reader;
   determining estimated lateral positions from servo readback signals read by the second servo reader at the skew angles;
   calculating expected lateral positions of the second servo reader at the skew angles from calculated distances between the first and the second servo readers and the skew angles;
   determining lateral error offsets comprising differences of the estimated lateral positions and the expected lateral positions at the skew angles;
   adding the lateral error offsets for the expected lateral positions to a lateral error offset data structure; and
   using the lateral error offset data structure to adjust a target lateral position at which to position the tape head.

2. The tape head controller of claim 1, wherein the servo pattern has a non-linear servo pattern.

3. The tape head controller of claim 1, wherein the operations further comprise:
   reading the servo pattern to calculate a distance between the first and the second servo readers; and
   saving the calculated distances to use to calculate the expected lateral positions to determine the lateral error offsets.

4. The tape head controller of claim 3, wherein the distance is calculated by:

reading lateral positions, at the second servo reader, at different skew angles formed between the first servo reader and the second servo reader; and calculating distances between the first servo reader and the second servo reader as a function of the skew angles and the read lateral positions, wherein the calculated distance comprises an aggregate of the calculated distances.

5. The tape head controller of claim 4, wherein the function calculates the distance by dividing a read lateral position by a Sine of the skew angle.

6. The tape head controller of claim 1, wherein the calculating the expected lateral positions comprises, for each given skew angle, a Sine of the given skew angle multiplied by a calculated distance.

7. The tape head controller of claim 1, wherein the operations further comprise:
performing the operations of the determining the estimated lateral positions from the servo readback signals, the calculating the expected lateral positions, the determining the lateral error offsets, and the adding the lateral error offsets to the lateral error offset data structure in response to initializing a tape cartridge including the tape medium; and
saving the lateral error offset data structure in a memory to use during read and write operations to use to adjust target lateral positions of the tape head.

8. The tape head controller of claim 1, wherein the using the lateral error offset data structure comprises:
determining a target lateral position at which to position the tape head to read or write data in a data area;
determining, from the lateral error offset data structure, a lateral error offset associated with the target lateral position;
adjusting the target lateral position by the lateral error offset to produce an adjusted target lateral position; and
controlling the tape head to move to the adjusted target lateral position where the first and second servo readers are reading servo readback signals on the servo pattern at the adjusted target lateral position.

9. The tape head controller of claim 1, wherein the determining, from the lateral error offset data structure, the lateral error offset associated with the target lateral position comprises:
determining whether the lateral error offset data structure includes an entry associating a lateral offset error with a lateral position equal to the target lateral position;
returning the lateral offset error associated with the lateral position equal to the target lateral position in response to determining that the lateral error offset data structure provides a lateral offset error associated with the target lateral position; and
estimating the determined lateral offset error from at least one lateral offset error associated with at least one lateral position closest to the target lateral position in the lateral error offset data structure.

10. A tape drive, comprising:
a tape head comprising a first module having a first servo reader and a second module having a second servo reader, with respect to a servo pattern written to a tape medium; and
a controller for controlling the tape head, wherein the controller performs operations, the operations comprising:
rotating the tape head to rotate the second servo reader at skew angles with respect to the first servo reader;
determining estimated lateral positions from servo readback signals read by the second servo reader at the skew angles;
calculating expected lateral positions of the second servo reader at the skew angles calculated distances between the first and the second servo readers and the skew angles;
determining lateral error offsets comprising differences of estimated lateral positions and the expected lateral positions at the skew angles;
adding the lateral error offsets for the expected lateral positions to a lateral error offset data structure; and
using the lateral error offset data structure to adjust a target lateral position at which to position the tape head.

11. The tape drive of claim 10, wherein the servo pattern has a non-linear servo pattern.

12. The tape drive of claim 10, wherein the operations further comprise:
reading the servo pattern to calculate a distance between the first and the second servo readers; and
saving the calculated distances to use to calculate the expected lateral positions to determine the lateral error offsets.

13. The tape drive of claim 12, wherein the distance is calculated by:
reading lateral positions, at the second servo reader, at different skew angles formed between the first servo reader and the second servo reader; and
calculating distances between the first servo reader and the second servo reader as a function of the skew angles and the read lateral positions, wherein the calculated distance comprises an aggregate of the calculated distances.

14. The tape drive of claim 10, wherein the calculating the expected lateral positions comprises, for each given skew angle, a Sine of the given skew angle multiplied by a calculated distance.

15. The tape drive of claim 10, wherein the using the lateral error offset data structure comprises:
determining a target lateral position at which to position the tape head to read or write data in a data area;
determining, from the lateral error offset data structure, a lateral error offset associated with the target lateral position;
adjusting the target lateral position by the lateral error offset to produce an adjusted target lateral position; and
controlling the tape head to move to the adjusted target lateral position where the first and second servo readers are reading servo readback signals on the servo pattern at the adjusted target lateral position.

16. A tape method for controlling a tape head, comprising a first module having a first servo reader and a second module having a second servo reader, with respect to a servo pattern written to a tape medium, comprising:
rotating the tape head to rotate the second servo reader at skew angles with respect to the first servo reader;
determining estimated lateral positions from servo readback signals read by the second servo reader at the skew angles;
calculating expected lateral positions of the second servo reader at the skew angles, from calculated distances between the first and the second servo readers and the skew angles;
determining lateral error offsets comprising differences of estimated lateral positions and the expected lateral positions at the skew angles;

adding the lateral error offsets for the expected lateral positions to a lateral error offset data structure; and using the lateral error offset data structure to adjust a target lateral position at which to position the tape head.

17. The method of claim 16, wherein the servo pattern has a non-linear servo pattern.

18. The method of claim 16, further comprising:

reading the servo pattern to calculate a distance between the first and the second servo readers; and saving the calculated distances to use to calculate the expected lateral positions to determine the lateral error offsets.

19. The method of claim 16, wherein the calculating the expected lateral positions comprises, for each given skew angle, a Sine of the given skew angle multiplied by a calculated distance.

20. The method of claim 16, wherein the using the lateral error offset data structure comprises:

determining a target lateral position at which to position the tape head to read or write data in a data area;

determining, from the lateral error offset data structure, a lateral error offset associated with the target lateral position;

adjusting the target lateral position by the lateral error offset to produce an adjusted target lateral position; and controlling the tape head to move to the adjusted target lateral position where the first and second servo readers are reading servo readback signals on the servo pattern at the adjusted target lateral position.

\* \* \* \* \*